March 25, 1952     W. G. NEALY     2,590,785
POULTRY DRESSING TOOL

Filed Nov. 6, 1950

William G. Nealy
INVENTOR.

BY *Clarence A. O'Brien
and Harvey B. Jacobson*
Attorneys

Patented Mar. 25, 1952

2,590,785

UNITED STATES PATENT OFFICE 2,590,785

POULTRY DRESSING TOOL

William G. Nealy, Terrell, Tex., assignor, by direct and mesne assignments, to Terrell Manufacturing Company, Inc., Terrell, Tex., a corporation of Texas Application November 6, 1950, Serial No. 194,206

1 Claim. (Cl. 17—11)

This invention relates to improvements in a poultry dressing device.

An object of this invention is to remove the rectum of a chicken, turkey or any other fowl by means of a power operated mechanical device which includes a guide or pilot which is so constructed as to enter the exterior opening of the main intestine to hold the portion of the fowl to be removed and also to guide a cutter which is rotating, into cutting contact with the part of the fowl around the exterior opening of the main intestine, this opening commonly known as the "vent" in the trade.

Ancillary objects and features of importance will become apparent in following the description of the illustrated form of the invention.

The invention makes it possible to process and dress poultry more rapidly and under more sanitary conditions than the procedure followed in the trade today. In removing the rectum of poultry in processing plants, the job is performed by hand with a knife. The fowl is ordinarily conveyed by a standard conveyor and an employee removes the rectum with a knife. Thereafter the vent is picked up with a hand hook in the hands of the person performing the removal operation and then in another operation the employee uses a knife and cuts or saws the vent from the fowl. This causes the contents of the main intestine to spill on the fowl. Inasmuch as this is unsanitary the fowl must be thoroughly washed and cleansed.

Figure 1:
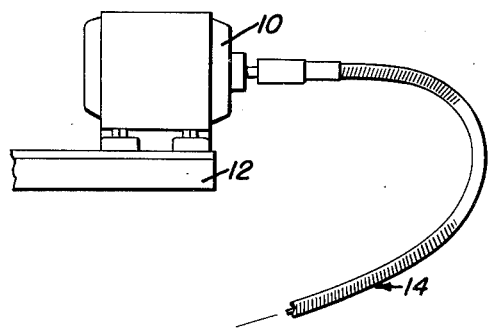
Figure 1 is a largely schematic view showing the method and apparatus of the invention.
Figure 1:
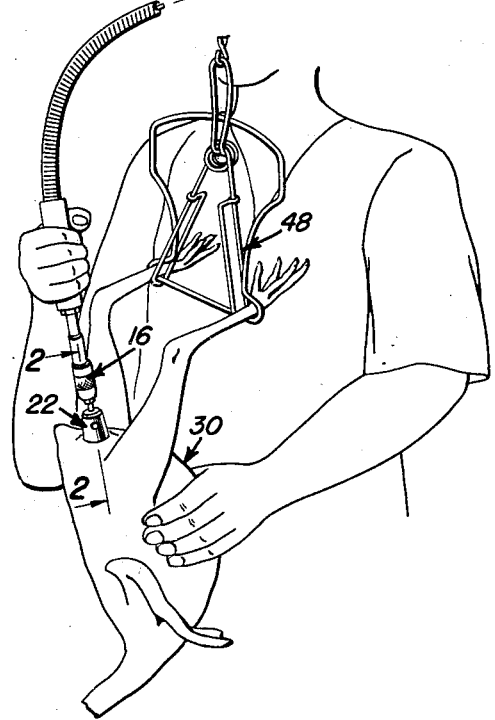
Figure 2:
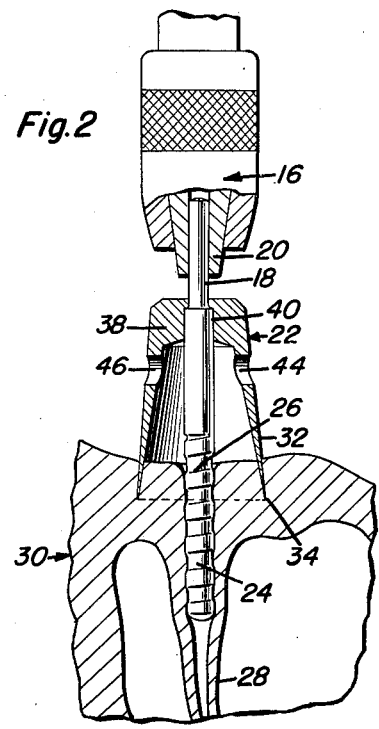
Figure 2 is an enlarged sectional view taken substantially on the line 2—2 of Figure 1 and in the direction of the arrows; and, Figure 3 is a perspective view of the cutter head including the pilot or guide, constituting a part of the invention.
Figure 3:
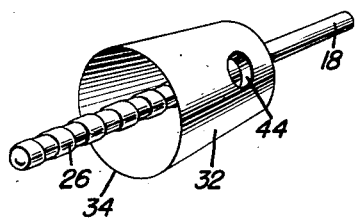

Attention is now invited to Figure 1 where there is a standard motor 10 disposed upon a suitable support 12. A flexible shaft assembly 14 is actuated by the motor shaft and has a chuck 16 at its outer end. This chuck is arranged to hold the shank 18 in its jaws 20, whereby the shank 18 may be readily removed through operation of the standard chuck 16.

This shank constitutes a part of the described means of rotating a cutter 22 and of rotating a pilot or guide 24. The guide is actually an extension or part of the shank 18 and this guide is threaded as at 26 for entry into the main intestine 28 of the fowl 30.

The cutter 22 is frusto-conical or cup shaped and has a tapered wall 32 with a sharp end 34 arranged to enter the fowl. The guide 24 is located in the center of the cutter 22 so that when the guide enters the external opening of the main intestine 28, the cutter forms an aperture in the fowl, the diameter of which is equal to twice the distance between the guide and any point on the wall of the cutter at the sharp end 34 thereof.

The cutter 22 is provided with an inner wall 38 which has an aperture 40 therein, the shank 18 passing through this aperture and being fixed to the material of the end wall 38 adjacent to the aperture 40 by any standard means. Vent openings 44 and 46 are provided in the wall of the cutter 22 to prevent pressure from building up behind the plug taken from the fowl and to permit this plug to be slid readily from the cutter.

Under actual commercial use conditions the poultry is held in an inverted position as disclosed in Figure 1 by the clamp 48 which is attached to the legs of the fowl near the feet thereof. In this way a person may handle the fowl for this operation rapidly.

In operation after the guide 24 is set in motion, it is inserted into the main intestine of the fowl by passing through the external opening thereof. Due to the threads on the guide, the guide is pulled inwardly of the intestine, causing the sharp edge 34 of the cutter 22 to be pulled against the fowl for removal of the rectum thereof. The result is that a neat and proper circular opening is made whereby the rectum may be pulled from the fowl leaving it intact with the main intestine and thereby permitting the drawing of the main intestine with the rectum or vent attached from the fowl without spillage of the waste in the main intestine on the remainder of the fowl.

Having described the invention, what is claimed as new is:

A poultry dressing tool comprising a rotary shank for connection with a source of power, a longitudinal guide of uniform diameter integral with one end of said shank and including a broad, flat, coarse feed thread, and a tapered cutter fixed on the shank and including a circular blade encircling the guide at an intermediate point and in spaced, concentric relation thereto.

WILLIAM G. NEALY.

REFERENCES CITED

The following references are of record in the file of this patent:

UNITED STATES PATENTS

| Number | Name | Date |
|---|---|---|
| 1,204,673 | Locke | Nov. 14, 1916 |
| 1,903,781 | Eisele | Apr. 18, 1933 |
| 1,943,077 | Jansen | Jan. 9, 1934 |
| 2,189,484 | Brodeur | Feb. 6, 1940 |
| 2,310,881 | Swanson | Feb. 9, 1943 |
| 2,502,794 | Koonz | Apr. 4, 1950 |